US 6,626,478 B1

(12) United States Patent
Minton

(10) Patent No.: US 6,626,478 B1
(45) Date of Patent: Sep. 30, 2003

(54) TAILGATE EXTENDER

(76) Inventor: David J. Minton, 5581 Twin Creek Cir., Pace, FL (US) 32571

( * ) Notice: Subject to any disclaimer, the term of this patent is extended or adjusted under 35 U.S.C. 154(b) by 0 days.

(21) Appl. No.: 10/289,006

(22) Filed: Nov. 6, 2002

(51) Int. Cl.[7] ............................ B62D 33/02; B62C 1/06; B60R 9/06
(52) U.S. Cl. ..................... 296/26.11; 296/37.6; 224/403
(58) Field of Search ............................ 296/26.11, 26.08, 296/26.09, 26.1, 37.6, 57.1; 224/402, 403, 404, 405; 160/114, 117, 119

(56) References Cited

U.S. PATENT DOCUMENTS

| 1,812,580 | A | * | 6/1931 | Black | |
|---|---|---|---|---|---|
| 2,713,897 | A | * | 7/1955 | Teague et al. | |
| 5,127,697 | A | * | 7/1992 | St. Marie | 296/37.6 |
| 5,441,324 | A | * | 8/1995 | Gold | |
| 5,788,311 | A | * | 8/1998 | Tibbals | |
| 5,997,066 | A | * | 12/1999 | Scott | 296/26.08 |
| 6,019,410 | A | * | 2/2000 | Trostle et al. | 296/26.11 |
| 6,257,637 | B1 | * | 7/2001 | Reed | 296/26.08 |
| 6,378,926 | B1 | * | 4/2002 | Rense et al. | 296/26.11 |
| 6,540,123 | B1 | * | 4/2003 | Kmita et al. | 224/403 |
| 6,550,841 | B1 | * | 4/2003 | Burdon et al. | 296/57.1 |
| 2002/0000732 | A1 | * | 1/2002 | Sanders | 296/26.08 |
| 2002/0096901 | A1 | * | 7/2002 | Iafrate et al. | 296/26.11 |
| 2002/0153737 | A1 | * | 10/2002 | Fitts | 296/26.11 |

* cited by examiner

Primary Examiner—D. Glenn Dayoan
Assistant Examiner—H. Gutman
(74) Attorney, Agent, or Firm—Peter Loffler

(57) ABSTRACT

A tailgate extender allows a pickup truck bed to be compartmentalized whenever the tailgate of the pickup truck is in the lowered position. A first extension member has a pair of hingedly attached panel members such that one of the panels is hingedly attached to a side of the bed. A second extension member has another pair of hingedly attached panel members hingedly attached to the opposing side of the pickup truck bed. In the extended position, the two extension members unfold and abut one another over the tailgate and are secured to each other in order to form a walled pickup truck bed. The two extension members may also be opened in an inverted position.

13 Claims, 4 Drawing Sheets

TAILGATE EXTENDER

BACKGROUND OF THE INVENTION

1. Field of the Invention

The present invention relates to a device that helps confine a load within a bed of a pickup truck when the bed of the pickup truck is extended by flipping the tailgate of the truck down.

2. Background of the Prior Art

Many loads that are carried by a pickup truck do not fit neatly within the bed of the pickup truck, especially the smaller framed trucks that are popular. Such loads are longer than the length of the pickup truck bed and do not sit within the bed. Therefore, in order to properly carry such a load by the particular pickup truck, one of two methods is generally employed.

The first method is to simply overlay the end of the load on the top of the truck's tailgate with that portion of the load that will not fit within the bed hanging out past the back of the pickup truck. While this method may work with some loads, it can prove to be problematic with other types of loads especially loads that have a large surface area such as lumber. As the load is angled up through the bed of the pickup truck, winds created when driving the truck can get underneath the load and act on it creating lift and possibly lifting the load out of the pickup truck. While tying the load down may help prevent load loss, the wind forces can still cause the load to sway dramatically making the driver of the pickup truck nervous as well as those around and especially behind the truck.

The other main method of carrying an oversized load by a pickup truck is to flip down the tailgate in order to extend the overall length of the pickup truck so that the length is the combined length of the pickup truck bed and the height, when closed, of the tailgate. This method allows the load to lay flat within the pickup truck bed and helps minimize load loss problems due to wind forces. However, this method can result in the load falling off the back of the pickup truck especially if the truck accelerates hard or is going up a steep incline. Additionally, this method is not feasible when the purpose of flipping the tailgate down is to provide overall cargo capacity to the pickup truck such as when a farmer needs to haul a large quantity of watermelons to the market. The watermelons would simply roll out of the back of the pickup truck bed.

In order to address this problem, gate systems have been proposed that place a physical barrier at the end of the extended pickup truck bed and help compartmentalize the bed. These devices extend the side walls of the pickup truck bed and also form the back wall that was previously formed by the tailgate in its up position. While these prior art devices tend to work well for their intended purpose, they suffer from one or more drawbacks.

Many such devices are simply very complex in design and construction making them expensive to manufacture and relatively difficult to install and use. Other prior art devices are relatively bulky so that when they are installed they rob the pickup truck bed of a large amount of available real estate.

Therefore, there exists a need in the art for a device that compartmentalizes a pickup truck bed when the tailgate is flipped down for extending the overall length of the pickup truck bed. Such a device must be of relatively simple design and construction so that the device is relatively inexpensive to manufacture and install and is relatively easy to use and maintain. The device must be relatively compact in design such that once installed within the pickup truck, minimal cargo capacity is lost within the pickup truck bed.

SUMMARY OF THE INVENTION

The tailgate extender of the present invention addresses the aforementioned needs in the art. The tailgate extender compartmentalizes a pickup truck bed when the tailgate is flipped down for extending the overall length of the pickup truck bed. The tailgate extender is of relatively simple design and construction making the device relatively inexpensive to manufacture and install and the device is relatively easy to use and maintain. The tailgate extender is of relatively compact design such that once installed within the pickup truck, minimal cargo capacity is lost within the pickup truck bed.

The tailgate extender of the present invention is comprised of a first extension member having a first panel with a first face and a second face, a first side edge that is hingedly attached to the first side of the bed of a pickup truck and a second side edge and a second panel with a third face and a fourth face, the second panel also having a third side edge hingedly attached to the second side edge of the first panel and a fourth side edge. The tailgate extender also has a second extension member having a third panel with a fifth face and a sixth face, a fifth side edge that is hingedly attached to the second side of the pickup truck bed and a sixth side edge and a fourth panel with a seventh face and an eight face, the fourth panel also having a seventh side edge hingedly attached to the sixth side edge of the third panel and an eight side edge. The first extension member is positioned between a first retracted position such that the first panel is generally flush against the first side of the pickup truck such that the first face of the first panel member faces the first side, and the second panel is generally flush against the first panel such that the second face of the first panel faces the fourth face of the second panel and the first extension member is positionable in a first extended position when the tailgate of the pickup truck is in the lowered position such that the first panel extends outwardly from the bed and is positionable over the tailgate and the first face of the first panel faces the second side of the pickup truck bed and the second panel extends generally toward the second side. The second extension member is positionable between a second retracted position such that the third panel is generally flush against the second side of the pickup truck bed such that the fifth face of the third panel faces the second side of the pickup truck bed, and the fourth panel is generally flush against the third panel such that the sixth side of the third panel faces the eight side of the fourth panel and a second extended position when the tailgate is in the lowered position such that the third panel extends outwardly from the bed and is positionable over the tailgate and the fifth face of the third panel faces the first side of the pickup truck bed and the fourth panel extends generally toward the first side of the pickup truck bed such that the fourth side edge of the second panel and the eight side edge of the fourth panel abut one another and the second panel and the fourth panel are connected to each other. The second panel and the fourth panel are connected to each other by providing a sliding bar on the second panel that is receivable within a catch member located on the fourth panel. The sliding bar is located on the fourth face of the second panel and the catch member is located on the eight face of the fourth panel member. A first pin is attached to the second panel and is receivable within a first opening located on the tailgate and a second pin is attached to the fourth panel and is receivable within a second opening located on the tailgate. Means are provided for holding the first extension member in the first retracted position and for holding the second extension member in the second retracted position.

BRIEF DESCRIPTION OF THE DRAWINGS

Similar reference numerals refer to similar parts throughout the several views of the drawings.

DESCRIPTION OF THE PREFERRED EMBODIMENT

Figure 1:
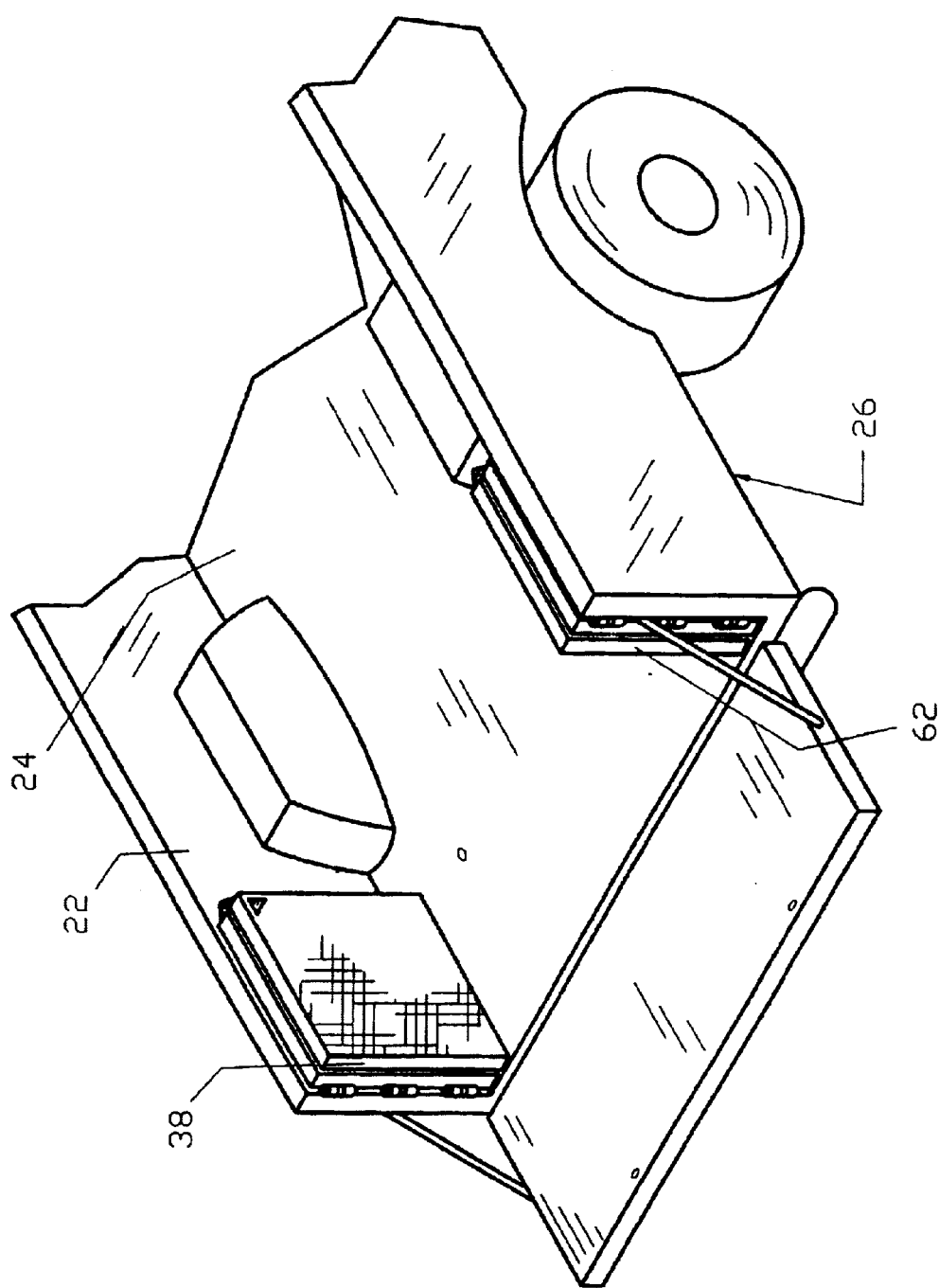
FIG. 1 is an environmental view of the tailgate extender of the present invention installed in a pickup truck with the tailgate extender in a retracted position.
Figure 2:
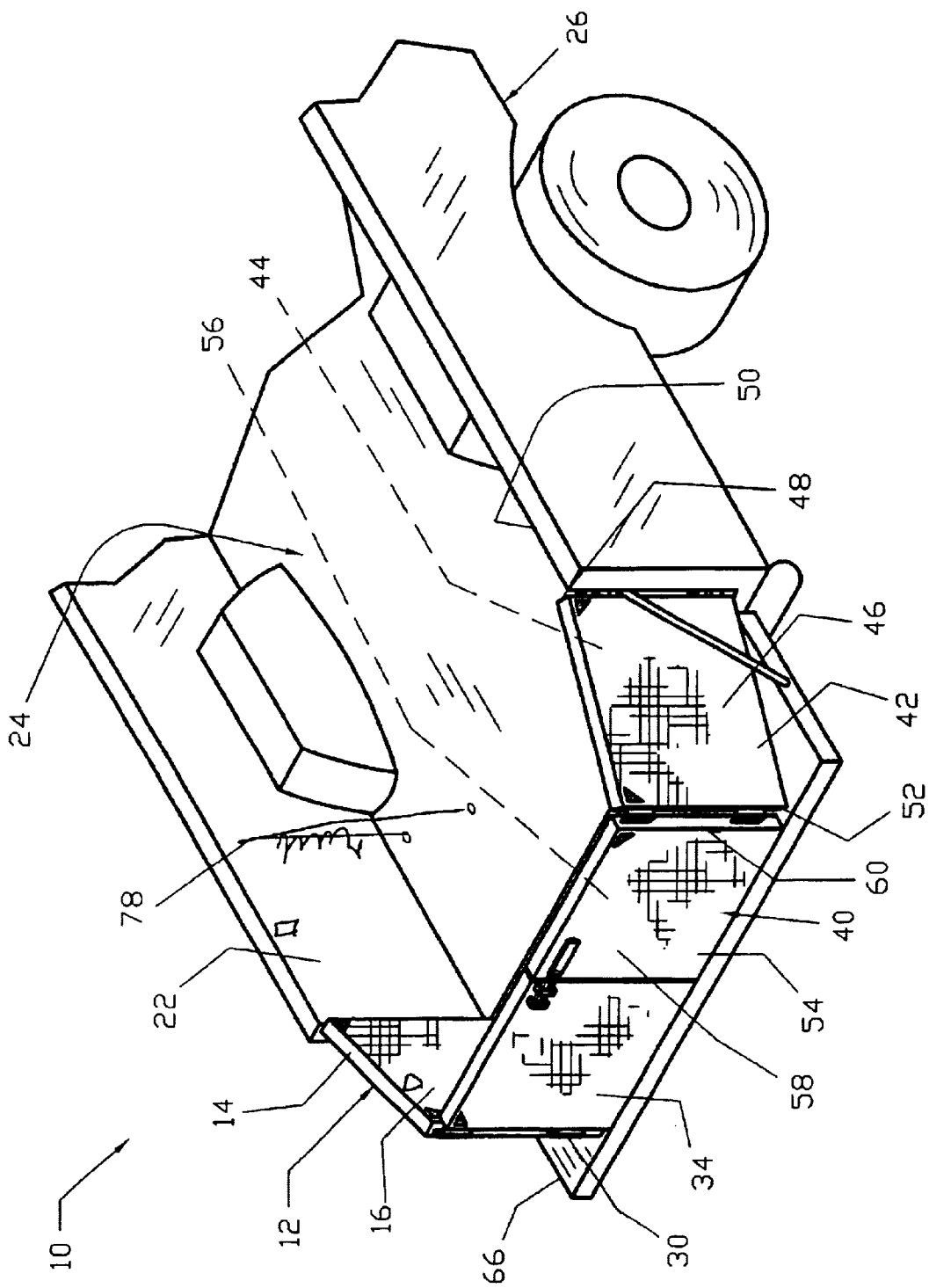
FIG. 2 is an environmental view of the tailgate extender of the present invention installed in a pickup truck with the tailgate extender in an extended position.
Figure 3:
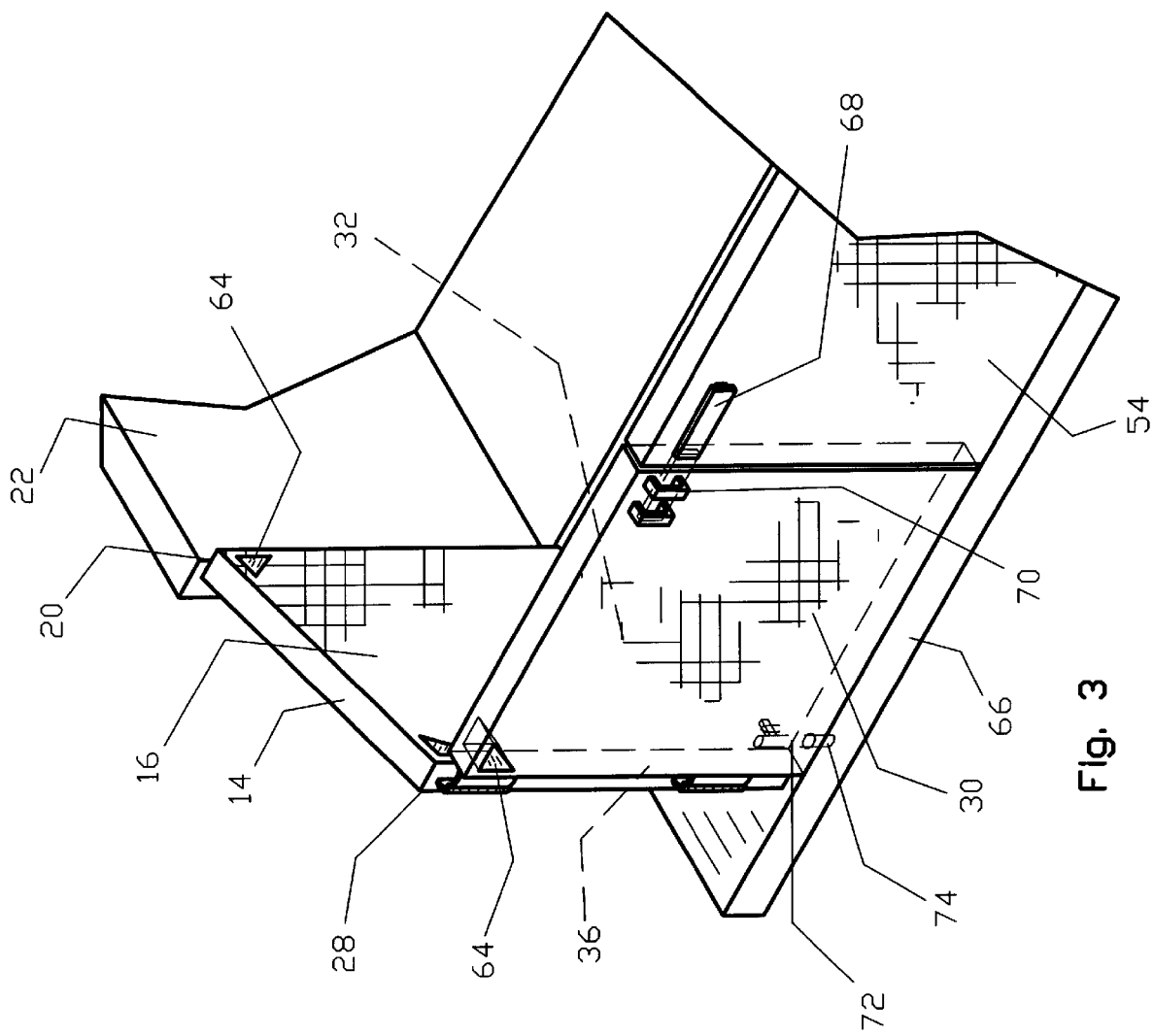
FIG. 3 is a close-up view of a portion of the tailgate extender in the extended position.

Referring now to the drawings, it is seen that the tailgate extender of the present invention, generally denoted by reference numeral 10, is comprised of a first extension member 12 having a first panel 14 with a first face 16 and a second face 18, a first side edge 20 that is hingedly attached to the first side 22 of the bed 24 of a pickup truck 26 and a second side edge 28 and a second panel 30 with a third face 32 and a fourth face 34, the second panel 30 also having a third side edge 36 hingedly attached to the second side edge 28 of the first panel 14 and a fourth side edge 38. The tailgate extender 10 also has a second extension member 40 having a third panel 42 with a fifth face 44 and a sixth face 46, a fifth side edge 48 that is hingedly attached to the second side 50 of the pickup truck bed 24 and a sixth side edge 52 and a fourth panel 54 with a seventh face 56 and an eight face 58, the fourth panel 54 also having a seventh side edge 60 hingedly attached to the sixth side edge 52 of the third panel 42 and an eight side edge 62. The four panels 14, 30, 42, and 54, of the two extension members 12 and 40 may be made from any appropriate sturdy material such as plastic or metal and may be relatively solid members or they may be open members such that air can flow through the various panels 14, 30, 42, and 54. Openings 64 can be provided on one or more of the panels 14, 30, 42, and 54, which openings 64 can be used as tie down points for securement of a load being carried by the pickup truck 26.

The first extension member 12 is positioned between a first retracted position such that the first panel 14 is generally flush against the first side 22 of the pickup truck 26 such that the first face 16 of the first panel member 14 faces the first side 22, and the second panel 30 is generally flush against the first panel 14 such that the second face 18 of the first panel 14 faces the fourth face 34 of the second panel 30 and the first extension member 12 is positionable in a first extended position when the tailgate 66 of the pickup truck 26 is in the lowered position such that the first panel 14 extends outwardly from the bed 24 of the pickup truck 26 and is positionable over the tailgate 66 and the first face 16 of the first panel 14 faces the second side 50 of the pickup truck bed 24 and the second panel 30 extends generally toward the second side 50 of the pickup truck bed 24. The second extension member 40 is positionable between a second retracted position such that the third panel 42 is generally flush against the second side 50 of the pickup truck bed 24 such that the fifth face 44 of the third panel 42 faces the second side 50 of the pickup truck bed 24, and the fourth panel 54 is generally flush against the third panel 42 such that the sixth side 46 of the third panel 42 faces the eight side 58 of the fourth panel member 54 and a second extended position when the tailgate 66 of the pickup truck 26 is in the lowered position such that the third panel 42 extends outwardly from the bed 24 of the pickup truck 26 and is positionable over the tailgate 66 and the fifth face 44 of the third panel 42 faces the first side 22 of the pickup truck bed 24 and the fourth panel 54 extends generally toward the first side 22 of the pickup truck bed 24 such that the fourth side edge 38 of the second panel 30 and the eight side edge 62 of the fourth panel 54 abut one another and the second panel 30 and the fourth panel 54 are connected to each other by any appropriate method known in the art.

One such method for connecting the second panel 30 and the fourth panel 54 provides a sliding bar 68 on the fourth panel 54 that is receivable within a catch member 70 located on the second panel 30 (or vice versa). A first pin 72 is attached to the second panel 30 and is receivable within a first opening 74 located on the tailgate 66, such that when the first extension member 12 is in the extended position, the first pin 72 is received within the first opening 74 on the tailgate for holding the first extension securely in place. Similarly, a second pin (not illustrated) is attached to the fourth panel 54 and is receivable within a second opening 76 located on the tailgate 66 such that when the second extension member 40 is in the extended position, the second pin is received within the second opening on the tailgate 66 for holding the second extension 40 securely in place. The first pin 72 and the second pin are each spring-loaded in order to hold the pins within their respective openings.

Means are provided for holding the first extension member 12 in the first retracted position and for holding the second extension member 40 in the second retracted position. Such means can include providing magnets (not illustrated) on either the first panel 14 or the second panel 30 or both for magnetically attracting and holding the opposing panel and by providing magnets (not illustrated) on either the third panel 42 or the fourth panel 54 or both for magnetically attracting and holding the opposing panel. Alternately, an opening 78 can be provided within the bed 24 of the pickup truck 26 and the first pin 70 and the second pin can be received within its respective opening 78.

In order to use the tailgate extender 10 of the present invention, the first side edge 20 of the first panel 14 is hingedly attached to the first side 22 of the pickup truck bed 24 proximate the end of the bed 24 whereat the tailgate 66 is located. The fifth side edge 48 of the third panel 42 is hingedly attached to the second side 50 of the pickup truck bed 24 opposite that attachment of the first side edge 20 of the first panel member 14. When the tailgate extender 10 is not in use, the first extension member 12 is placed into the first retracted position and the second extension member 40 is placed into the second retracted position. When use of the tailgate extender 10 is desired, the first extension member 12 and the second extension member 40 are each unfolded such that the fourth side edge 38 and the eight side edge 62 abut one another and the second panel 30 and the fourth panel 54 are connected to one another. The two panels 30 and 54 are secured to one another by the means provided and the pins are placed into their respective openings. The tailgate extender 10 now allows the pickup truck bed 24 to be encapsulated so as to be able to secure cargo therein. In order to use the pickup truck bed 24 in normal fashion, the pins are removed from their respective openings, the second panel 30 and the fourth panel 54 are decoupled from one another and the first extension member 12 and the second extension member 30 are each placed into their respective retracted positioned. Finally, the tailgate 66 is flipped into its closed position.

Figure 4:
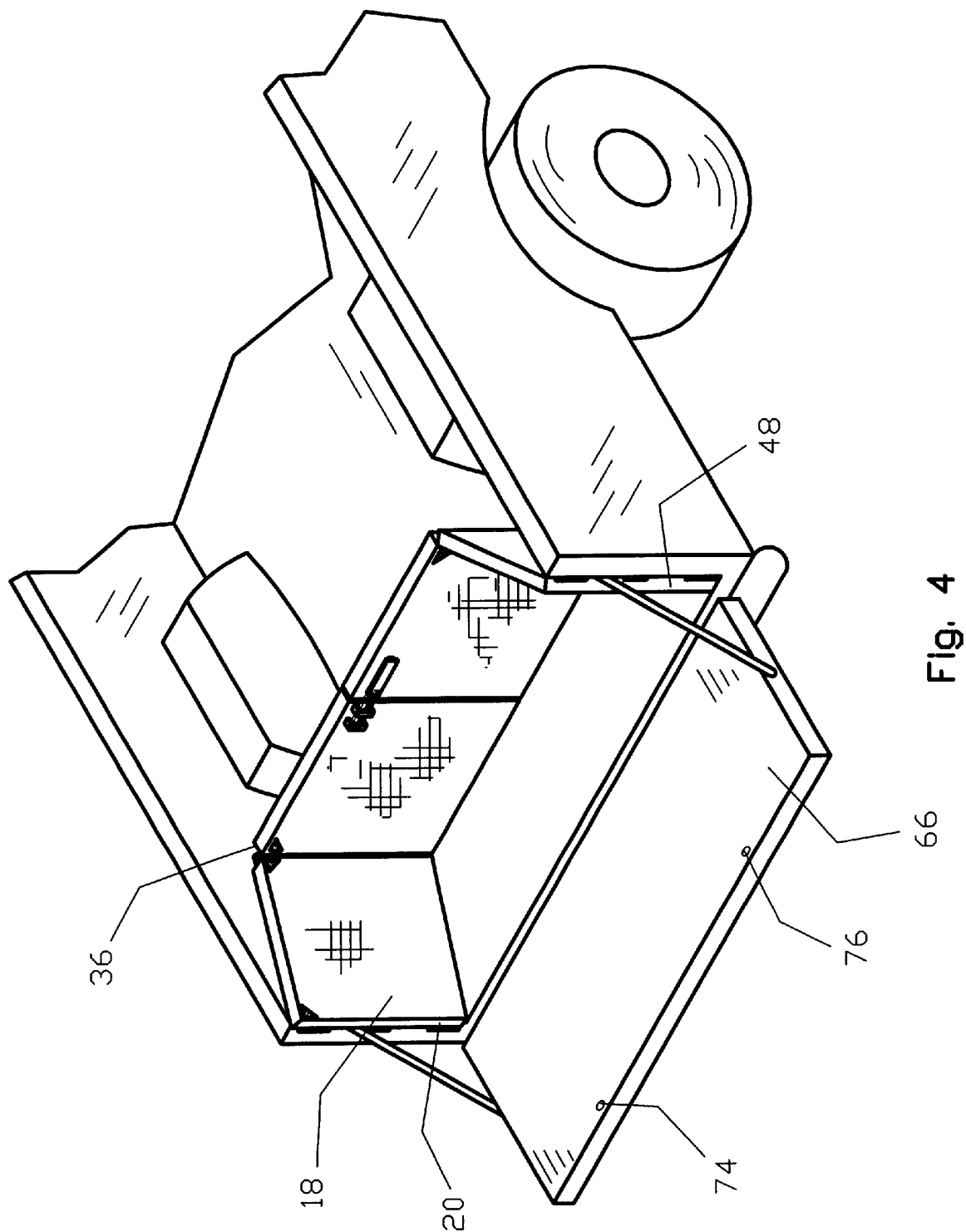
FIG. 4 is an environmental view of the tailgate extender of the present invention installed in a pickup truck with the tailgate extender in an inverted position.

As seen in FIG. 4, the tailgate extender can also be opened in an inverted position in order to hold small loads firmly within the bed 24 of the pickup truck 26. The two extension members 12 and 40 are placed into the extended position in similar fashion to that described above except that the extension members 12 and 30 are extended away, as opposed toward, the tailgate 66. Appropriate openings 78 are located within the pickup truck bed 24 for receiving the respective pins of the two extension members 12 and 30.

While the invention has been particularly shown and described with reference to an embodiment thereof, it will be appreciated by those skilled in the art that various changes in form and detail may be made without departing from the spirit and scope of the invention.

I claim:

1. A tailgate extender, in combination with a pickup truck, the pickup truck having a bed with a first side and a second side and a tailgate that flips between a raised position and a lowered position, the tailgate extender comprising:
    a first extension member having a first panel that is hingedly attached to the first side and a second panel that is hingedly attached to the first panel;
    a second extension member having a third panel hingedly attached to the second side and a fourth panel that is hingedly attached to the third panel;
    wherein the first extension member is positionable between a first retracted position such that the first panel is generally flush against the first side and the second panel is generally flush against the first panel and a first extended position when the tailgate is in the lowered position such that the first panel extends outwardly from the bed and is positionable over the tailgate and the second panel extends generally toward the second side, and the second extension member is positionable between a second retracted position such that the third panel is generally flush against the second side and the fourth panel is generally flush against the third panel and a second extended position when the tailgate is in the lowered position such that the third panel extends outwardly from the bed and is positionable over the tailgate and the fourth panel extends generally toward the first side such that the second panel and the fourth panel are connected to each other.

2. The tailgate extender as in claim 1 wherein the second panel and the fourth panel are connected to each other by providing a sliding bar on the second panel that is receivable on a catch member located on the fourth panel.

3. The tailgate extender as in claim 1 further comprising:
    a first pin attached to the second panel that is receivable within a first opening located on the tailgate; and
    a second pin attached to the fourth panel that is receivable within a second opening located on the tailgate.

4. The tailgate extender as in claim 3 wherein the first pin is spring-loaded and the second pin is spring-loaded.

5. The tailgate extender as in claim 1 further comprising:
    first means for holding the first extension member in the first retracted position; and
    second means for holding the second extension member in the second retracted position.

6. The tailgate extender as in claim 1 further comprising an opening located on at least one of the first panel, the second panel, the third panel, or the fourth panel.

7. A tailgate extender, in combination with a pickup truck, the pickup truck having a bed with a first side and a second side and a tailgate that flips between a raised position and a lowered position, the tailgate extender comprising:
    a first extension member having a first panel with a first face and a second face, a first side edge that is hingedly attached to the first side and a second side edge, and a second panel with a third face and a fourth face, and that has a third side edge hingedly attached to the second side edge of the first panel and a fourth side edge;
    a second extension member having a third panel with a fifth face and a sixth face, a fifth side edge hingedly attached to the second side and a sixth side edge and a fourth panel with a seventh face and an eight face, and that has a seventh side edge hingedly attached to the sixth side edge of the third panel and an eight side edge;
    wherein the first extension member is positionable between a first retracted position such that the first panel is generally flush against the first side such that the first face faces the first side, and the second panel is generally flush against the first panel such that the second face faces the fourth face and a first extended position when the tailgate is in the lowered position such that the first panel extends outwardly from the bed and is positionable over the tailgate and the first face faces the second side and the second panel extends generally toward the second side, and the second extension member is positionable between a second retracted position such that the third panel is generally flush against the second side such that the fifth face faces the second side, and the fourth panel is generally flush against the third panel such that the sixth side faces the eight side and a second extended position when the tailgate is in the lowered position such that the third panel extends outwardly from the bed and is positionable over the tailgate and the fifth face faces the first side and the fourth panel extends generally toward the first side such that the fourth side edge and the eight side edge abut one another and the second panel and the fourth panel are connected to each other.

8. The tailgate extender as in claim 7 wherein the second panel and the fourth panel are connected to each other by providing a sliding bar on the second panel that is receivable on a catch member located on the fourth panel.

9. The tailgate extender as in claim 8 wherein the sliding bar is located on the fourth face and the catch member is located on the eight face.

10. The tailgate extender as in claim 7 further comprising:
    a first pin attached to the second panel that is receivable within a first opening located on the tailgate; and
    a second pin attached to the fourth panel that is receivable within a second opening located on the tailgate.

11. The tailgate extender as in claim 10 wherein the first pin is spring-loaded and the second pin is spring-loaded.

12. The tailgate extender as in claim 7 further comprising:
    first means for holding the first extension member in the first retracted position; and
    second means for holding the second extension member in the second retracted position.

13. The tailgate extender as in claim 7 further comprising an opening located on at least one of the first panel, the second panel, the third panel, or the fourth panel.

\* \* \* \* \*